(No Model.) 2 Sheets—Sheet 1.
M. R. ETHRIDGE.
CLOTHES LINE HOLDER.
No. 479,136. Patented July 19, 1892.
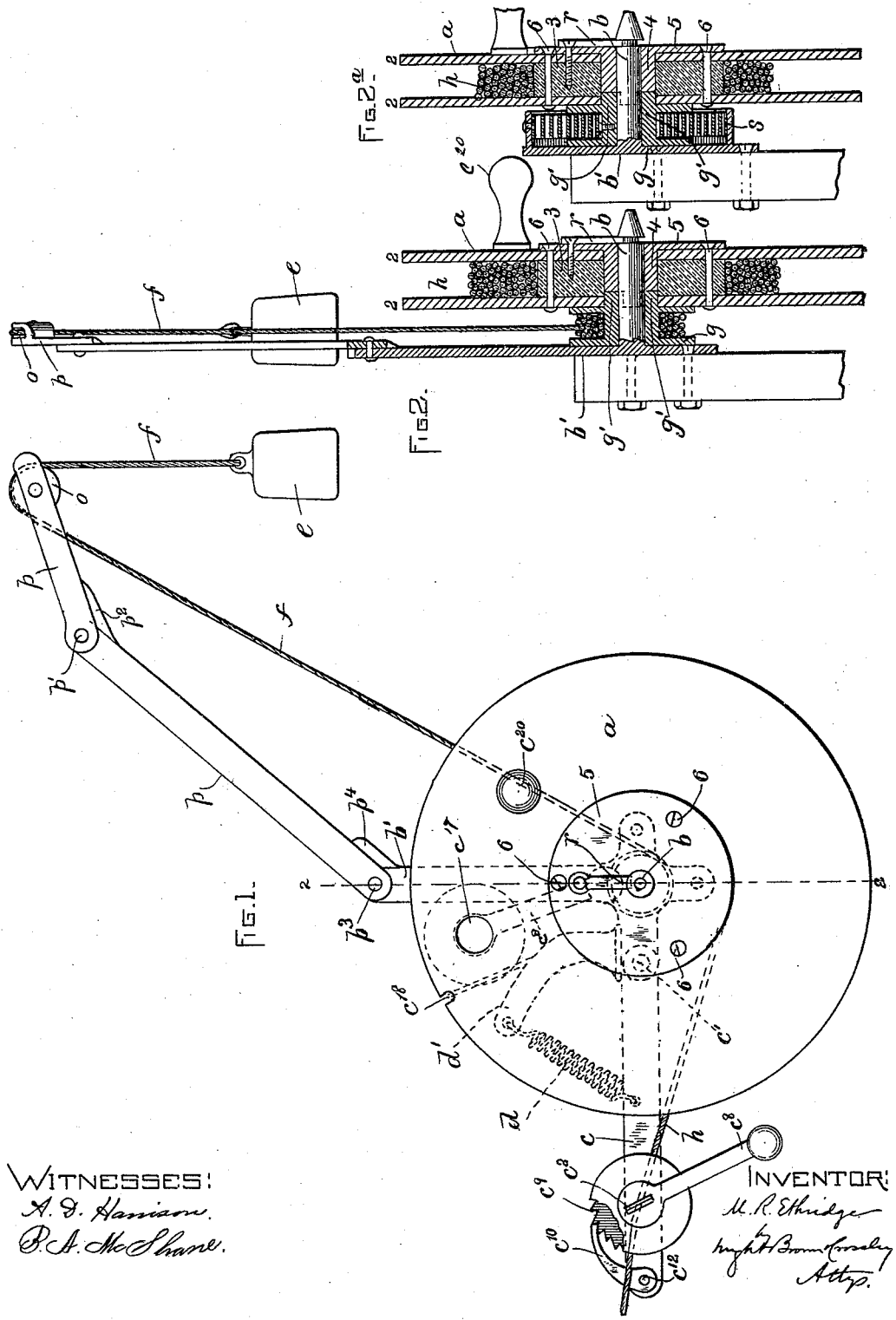
WITNESSES:
A. D. Harrison.
P. A. McShane.
INVENTOR:
M. R. Ethridge
by Wright Brown Crossley
Attys.

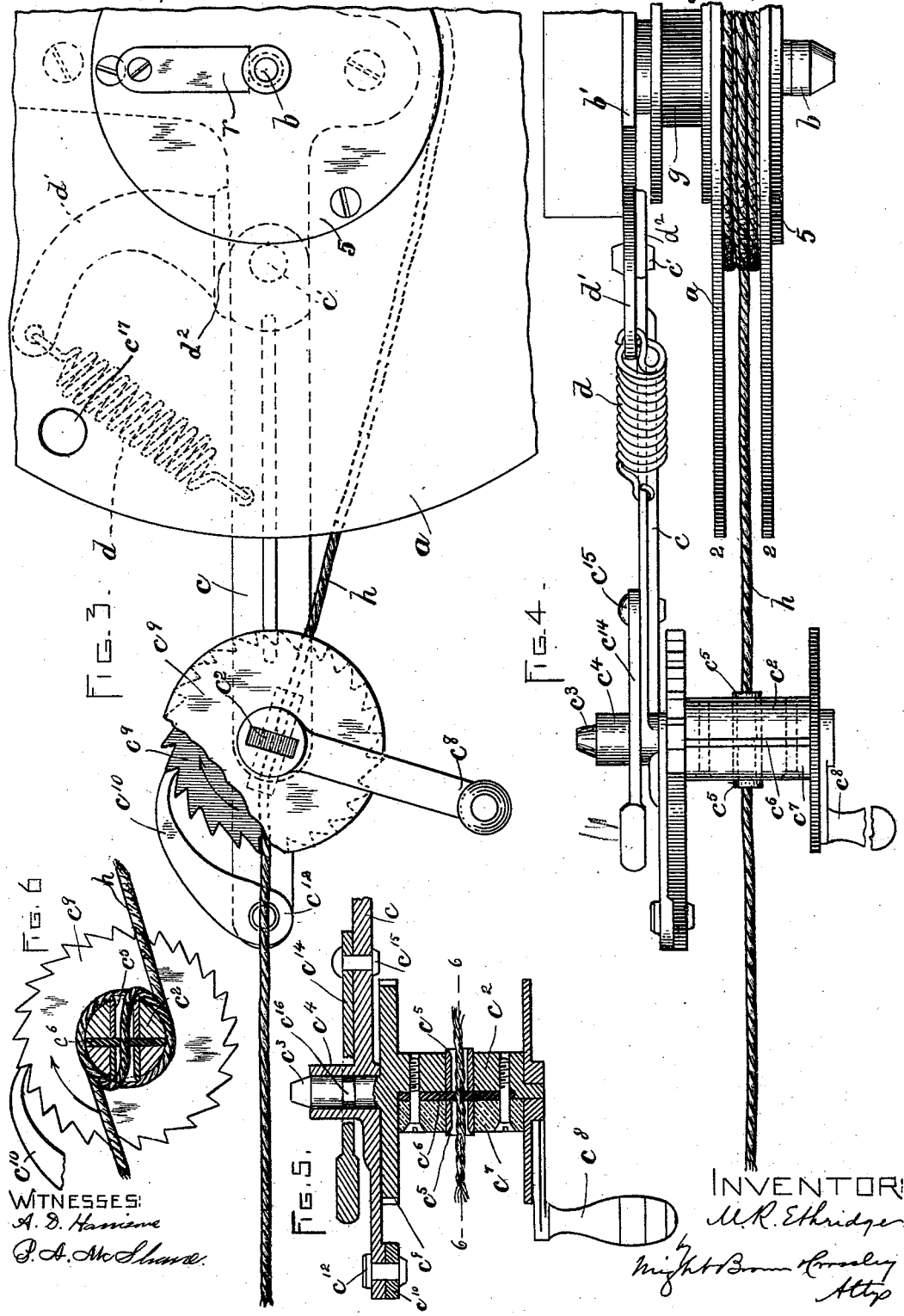

UNITED STATES PATENT OFFICE.

MARTIN R. ETHRIDGE, OF PORTSMOUTH, NEW HAMPSHIRE.

CLOTHES-LINE HOLDER.

SPECIFICATION forming part of Letters Patent No. 479,136, dated July 19, 1892.

Application filed March 12, 1892. Serial No. 424,647. (No model.)

*To all whom it may concern:*

Be it known that I, MARTIN R. ETHRIDGE, of Portsmouth, in the county of Rockingham and State of New Hampshire, have invented certain new and useful Improvements in Clothes-Line Holders, of which the following is a specification.

This invention has for its object to provide a clothes-line reel adapted to support a clothes-line in suitable position for unwinding and stretching between supports to adapt it to hold articles of clothing and also to provide means for automatically winding up the clothes-line when it is not further required for use.

The invention consists, mainly, in the improvements, which I will now proceed to describe and claim.

Of the accompanying drawings, forming part of this specification, Figure 1 represents a side elevation of a clothes-line reel embodying my invention, the rewinding-weight being shown as elevated in position to wind up the line. Fig. 2 represents a section on line 2 2, Fig. 1. Fig. $2^a$ is a similar section showing a modification. Fig. 3 represents an elevation of a portion of the device on a larger scale. Fig. 4 represents a top view of the parts shown in Fig. 3. Fig. 5 represents a horizontal section through the line-tightening device shown in Fig. 3. Fig. 6 represents a section on line 6 6, Fig. 5.

The same letters and numerals of reference indicate the same parts in all the figures.

In the drawings, $a$ represents a reel adapted to rotate on a fixed stud $b$, which is formed on or attached to a frame or plate $b'$, adapted to be affixed to a building or any other suitable support.

The reel $a$ may be of any suitable construction, and I have here shown it as composed of two disks or side pieces 2 2, separated by an intermediate smaller disk 3, mounted upon a metallic hub 4, which is provided with a flange 5, secured to the disks 2 2 and 3 by rivets 6 6. The clothes-line $h$ is attached at one end to the reel, so that when its outer end is pulled outwardly the reel will be rotated and caused to give out the line.

$g$ represents a pulley or drum, which is mounted to rotate upon the stud $b$, and is located between the frame $b'$ and reel $a$. The drum $g$ is provided with clutch-teeth $g'$, adapted to engage with corresponding teeth or recesses in one end of the hub 4 of the reel, so that the reel and drum will necessarily rotate together.

$e$ represents a weight, which is attached to one end of a cord $f$, which may be a length of wire or other rope, or a chain. Said cord passes over a pulley $o$, which is journaled to rotate in bearings in an arm $p$, secured to the frame $b'$, that supports the stud $b$. The cord $f$ passes from the pulley $o$ to the drum $g$, and is attached to said drum in any suitable way. The arrangement of the cord $f$ relatively to the drum $g$ is such that when the reel $a$ is rotated in giving out the clothes-line the drum $g$ will be rotated in the direction required to wind the cord $f$ upon it, and thus elevate the weight $e$, the weight being thus adjusted or set so that when free to descend it will rotate the reel $a$ through the drum $g$ and the described clutch connection in the direction required to wind the clothes-line $h$ upon the drum.

$c$ represents an arm, secured in any suitable way to the supporting-frame, preferably by being pivoted at $c'$ to an ear on said frame, said arm projecting outwardly so that its outer end is outside the periphery of the reel. Journaled to rotate freely in a bearing in the outer portion of said arm is a line-tightening device, which comprises a short shaft $c^2$, having at one end a trunnion $c^3$, which rotates in the bearing $c^4$ on the arm $c$. The shaft $c^2$ is provided with means for engagement with the clothes-line $h$, such means preferably being a bushing or line-guide $c^5$ extending through the shaft and made in two parts, between which is clamped a piece $c^6$ of rubber or other suitable yielding material having a hole which closely fits the line, so that the yielding piece $c^6$ acts as a wiper to remove dirt from the line when the latter is being drawn in upon the reel. The bushing $c^5$ is preferably of wood, so that the line in passing through the shaft $c^2$ will not come in contact with iron. The line is therefore prevented from discoloration by rust. The wiper $c^6$ is preferably secured to the shaft by means of a clamping-piece $c^7$, which is detachably secured to the shaft by means of screws. The bushing $c^5$ is made in two parts, one of which is attached to the body of the shaft and the other to the clamp $c^7$, as shown in Fig. 5. The shaft $c^2$ is provided with a crank or handle $c^8$, by which it may be rotated, and with a ratchet $c^9$, the teeth of which are formed to engage a pawl $c^{10}$, which is pivoted at $c^{12}$ to the outer end of the arm $c$. The arrangement of the ratchet and pawl is such that the pawl when engaged with the ratchet permits the rotation of the shaft in the direction required to cause it to wind the line upon itself, and thus tighten or take up the slack in the portion of the line that extends outwardly from the apparatus. The shaft $c^2$ and its handle $c^8$ therefore constitute a tightening device whereby the operative part of the line may be made as taut as may be desired, the pawl $c^{10}$ retaining any tension that may be thus imparted to the line.

The reel $a$ is connected to its journal $b$, so that it will rotate with sufficient freedom on said journal to permit the unwinding of the line from the reel when the tightening-shaft $c^2$ is rotated to tighten the operative part of the line, it being obvious that the rotation of the shaft $c^2$ will require the winding of the line upon it from both directions. Hence the reel gives out as much line to the tightening-shaft as the latter takes up from the operative part of the line. The ratchet $c^9$ and pawl $c^{10}$ oppose the rotation of the drum in the direction required to unwind the line from the drum. Hence the weight cannot rotate the drum when said pawl and ratchet are engaged, the line being engaged with the tightening-shaft, so that it cannot slip through it.

$d$ represents a spring, which is connected at one end with the arm $c$ and at the other end with a bracket $d'$, affixed to the supporting-frame $b'$. Said spring normally holds the arm $c$ and the line-tightening device supported thereby in the position shown in Figs. 1 and 3, the arm $c$ bearing against a stop or shoulder $d^2$ on the bracket when in said position. The spring permits the arm $c$ to yield or swing downwardly, so that the line-tightening device can conform to the size of the coil or accumulation of line upon the reel, it being desirable to keep the tightening device in such position that the line will not be deflected to any great extent by it. If the tightening device were rigidly supported, it would necessarily cause a deflection of the line to an extent determined by the size of the accumulation of line on the reel, and this deflection, in addition to such as might result from not having the end point of attachment in line with the arm $c$, would impose a strain upon the parts supporting the tightening device which might result in their breakage.

By adapting the tightening device to adjust itself to the line, as above described, I prevent any great deflection of the line, and thus relieve the arm $c$ from any injurious strain caused by the tightening of the line.

I prefer to make the reel $a$ readily separable from the stud $b$ and the line-tightening device as readily separable from the arm $c$, so that the reel and the tightening device may be removed together from the supporting-frame when not required for use. To this end the reel $a$ may be secured to the stud $b$ by a detachable key or plate $r$, the removal of which permits the separation of the reel from the stud $b$ and drum $g$. This key, as shown in the drawings, consists of a plate secured to the side of the reel and having one end entering an annular groove formed in the end of the stud $b$. The tightening-shaft $c^2$ is detachably connected to the arm $c$ by means of a latch $c^{14}$, which is pivoted at $c^{15}$ to the arm $c$ and is arranged to engage a peripheral groove $c^{16}$ in the reduced end or trunnion $c^3$ of the shaft $c^2$, said latch passing through a slot in the bearing $c^4$. When the latch is raised, the trunnion may be readily removed with the tightening-shaft and the wiper. The reel is provided with a socket or orifice $c^{17}$ to receive the trunnion $c^3$, so that when the tightening device is removed from the arm $c$ it can be applied to the reel by inserting the trunnion $c^3$ in the orifice $c^{17}$. This arrangement is adopted for convenience in keeping the parts together when not in use.

When the tightening device is engaged with the reel, as last described, the free end of the line passes over the margin of the reel through a notch $c^{18}$, provided in said margin, all as shown in dotted lines in Fig. 1. The reel may be provided with a handle $c^{20}$, by which it may be conveniently grasped to transport it from place to place.

I prefer to make the arm $p$, that supports the pulley $o$, in two sections connected by a pivot at $p'$, the outer section, in which the pulley is mounted, being supported by a lug $p^2$, formed on the main section of the arm $p$. Said main section may be pivoted at $p^3$ to the frame $b'$ and supported in the position shown in Fig. 1 by a lug $p^4$ on the frame $b'$.

The operation of the described device is as follows: The reel being in place on the stud $b$ and the main portion of the line wound thereon, when it is desired to use the line the free end is drawn outwardly through the wiper in the tightening-shaft $c^2$. This movement of the line rotates the reel in the direction required to raise the weight. When the line has been drawn out the required distance, its outer end is secured to a suitable support, after which the tightening-shaft may be rotated in the direction indicated by the arrows in Figs. 3 and 6 to take up the slack of the line, portions of the line being thus wound upon the tightening-shaft, as shown in Fig. 6, the pawl and ratchet being arranged to permit the described rotation of the tightening-shaft and to retain it in any position to which it may be rotated in said direction. Hence the pawl and ratchet not only retain the tension in the operative part of the line, but also support the weight in its raised position and prevent it from rotating the reel. When the line is no longer required for use, the operator disengages the pawl $c^{10}$ from the ratchet $c^9$ and turns the tightening device until the portions of the line which were wound upon the periphery of the tightening-shaft are removed therefrom, as indicated in Fig. 3, whereupon the weight will act to draw in the line through the tightening device and wiper. As the line is drawn in it is cleaned by the wiper, so that any dirt which may be taken up by the line in its passage along the ground is removed before the line is wound up. After the line has been wound up the tightening device may be removed from the arm $c$ and inserted in the socket in the reel, so that the tightening device holds the free end of the line and prevents it from being unwound from the reel. The reel and tightening device may now be removed together from the stud $b$ and housed for safe keeping.

I do not limit myself to the particular construction and arrangement here shown, and may vary the same in particulars requiring the exercise of ordinary mechanical skill and judgment without departing from the spirit of the invention. For example, a spring may be substituted for the weight, as shown in Fig. $2^a$, in which $s$ represents a spring, which is attached at one end to the supporting-frame $b'$ and at the other end to the drum $g$, the drum being in this case adapted to be rotated on the stud $b$ by the spring, and provided with suitable clutch-teeth. It is obvious that a spring arranged to act as described is an equivalent for the weight, each device constituting a motor for automatically winding the line upon the reel.

I do not limit myself to the detachable connection of the reel with the drum, which is rotated to automatically wind up the line. In case it is not desirable to remove the reel from the stud on which it rotates there may be a permanent connection between the cord $f$ or the spring $s$ and the reel itself, instead of having said cord or spring attached to a rotating device that is detachably engaged with the reel. I prefer, however, the detachable connection of the reel and the device for automatically rotating it, on account of the obvious advantage of removing the reel from the fixed part of the apparatus and storing it when the line is not required for use.

I believe myself to be the first to provide a clothes-line holder which comprises a reel, a motor adapted to automatically wind the line upon the reel, and a line tightening and locking device separate from the reel-shaft and adapted to take up the slack of the operative part of the line. I do not, therefore, limit myself to the particular relative arrangement of said parts here shown nor to the particular construction of the line tightening and locking device, as said device may be arranged in any other suitable relation to the reel and constructed in any other suitable way to produce the described result—namely, preventing the action of the motor in winding up the line and holding the operative or extended part of the line under any desired degree of tension.

I claim—

1. A clothes-line holder comprising in its construction a frame or support, a clothes-line reel rotatively connected with said support, an automatic motor—such as a weight or spring—adapted to wind the line upon the reel, and a line stretching and locking device independent of the reel-shaft and carried by said support to prevent the line-winding action of the weight or spring, as set forth.

2. A clothes-line holder comprising in its construction a frame or support, a clothes-line reel rotatively connected with said support, a motor adapted to automatically wind the line upon the reel, and a rotary line tightening and locking device supported by the frame at one side of the reel, as set forth.

3. A clothes-line holder comprising in its construction a frame or support, a clothes-line reel rotatively connected with said support, an arm pivotally connected with the support, a motor adapted to automatically wind the line upon the reel, a rotary line tightening and locking device mounted on the arm, and a spring which yieldingly holds the tightening device in its normal position and permits it to yield therefrom, as set forth.

4. A clothes-line holder comprising in its construction a frame or support, a motor adapted to automatically wind the line on the reel, separable connections between the reel and motor, a line-wiper arranged at one side of the reel, and means for detachably connecting said wiper with the frame or support, the reel and wiper being removable with the line from the support, as set forth.

5. In a clothes-line holder, the combination of a frame or support provided with a stud, a drum mounted to rotate on the stud and provided with clutch-teeth, a clothes-line reel mounted on the stud and provided with clutch-teeth adapted to engage the teeth of the drum, means for detachably securing the reel on the stud and permitting its removal therefrom, and a motor connected with the drum and adapted to be adjusted for action by the rotation of the drum, as set forth.

6. The improved clothes-line holder, comprising in its construction a frame or support, a clothes-line reel having a socket, such as $c^{17}$, a motor to automatically wind the line on said reel, separable connections between the motor and reel, and a rotary line-tightening device having a stud or trunnion, such as $c^3$, detachably connected with the support and adapted to enter the socket $c^{17}$, as set forth.

7. The improved clothes-line holder, comprising in its construction a frame or support, a clothes-line reel having a socket, such as $c^{17}$, a motor to automatically wind the line on the reel, and a line tightening and locking device comprising a shaft rotatively and detachably connected with the support at one side of the reel and provided with a crank or handle, a ratchet affixed to said shaft, and a pawl on the support adapted to engage said ratchet, as set forth.

In testimony whereof I have signed my name to this specification, in the presence of two subscribing witnesses, this 7th day of March, A. D. 1892.

MARTIN R. ETHRIDGE.

Witnesses:
C. F. BROWN,
A. D. HARRISON.